US008408563B1

(12) United States Patent
Ross et al.

(10) Patent No.: US 8,408,563 B1
(45) Date of Patent: Apr. 2, 2013

(54) SULKY WITH ADJUSTABLE WHEEL POSITIONS

(75) Inventors: Beverly W. Ross, Rochester, MI (US); Gary Helzerman, Stockbridge, MI (US); Larry Carlson, Brighton, MI (US); Tamaira Ross, Seattle, WA (US)

(73) Assignee: Beverly W. Ross, Rochester, MI (US)

( * ) Notice: Subject to any disclaimer, the term of this patent is extended or adjusted under 35 U.S.C. 154(b) by 0 days.

(21) Appl. No.: 13/450,033

(22) Filed: Apr. 18, 2012

Related U.S. Application Data

(63) Continuation-in-part of application No. 29/405,470, filed on Nov. 2, 2011, now Pat. No. Des. 665,702.

(51) Int. Cl.
*B62C 1/08* (2006.01)

(52) U.S. Cl. ............................ 280/64; 280/43; 280/63

(58) Field of Classification Search ............... 280/43, 280/63, 64, 66
See application file for complete search history.

(56) References Cited

U.S. PATENT DOCUMENTS

| | | | |
|---|---|---|---|
| 395,375 A * | 1/1889 | Yale | 280/64 |
| 502,984 A | 8/1893 | McIntosh et al. | |
| D35,567 S | 1/1902 | Dredge et al. | |
| 3,163,438 A * | 12/1964 | Bliss, Jr. | 280/43 |
| 3,415,533 A | 12/1968 | Bliss | |
| 3,503,624 A | 3/1970 | Weber et al. | |
| 3,907,325 A | 9/1975 | Gaines et al. | |
| 4,078,829 A | 3/1978 | Davis | |
| 4,095,815 A | 6/1978 | Mitchell | |
| 4,313,611 A | 2/1982 | Heinze, Jr. et al. | |
| D276,902 S | 12/1984 | Plugge | |
| D297,720 S | 9/1988 | Fragione, Jr. | |
| 5,183,279 A | 2/1993 | Acerno et al. | |
| 5,348,328 A | 9/1994 | Millington | |
| 5,857,686 A | 1/1999 | Millington | |
| D427,945 S | 7/2000 | Kirkpatrick | |
| 6,247,711 B1 | 6/2001 | Saraydar | |
| 6,354,613 B1 | 3/2002 | Stein et al. | |
| 7,059,626 B2 | 6/2006 | Koch | |
| 7,578,510 B2 | 8/2009 | Ross et al. | |
| 2005/0212240 A1 | 9/2005 | Harmer et al. | |
| 2011/0233883 A1 | 9/2011 | Watson | |

FOREIGN PATENT DOCUMENTS

WO 9319969 10/1993

* cited by examiner

*Primary Examiner* — J. Allen Shriver, II
*Assistant Examiner* — Brian Cassidy
(74) *Attorney, Agent, or Firm* — Howard & Howard Attorneys PLLC

(57) ABSTRACT

A sulky includes a frame having a cross-member and a pair of shafts spaced from each other and extending from the cross-member forwardly along an axis. A first wheel support and a second wheel support each rotatably extend downwardly from the frame and each engage wheels, respectively. Each of the first and second wheel supports includes an adjustment feature defining a plurality of adjustment positions. The wheels are engaged with the first and second wheel supports, respectively, and are independently adjustable relative to the first and second wheel supports, respectively, to any of the adjustment positions. The plurality of adjustment positions of the first and second wheel supports are located along lines generally extending rearwardly along the axis and upwardly relative to the axis.

17 Claims, 8 Drawing Sheets

SULKY WITH ADJUSTABLE WHEEL POSITIONS

CROSS-REFERENCE TO RELATED APPLICATIONS

The subject patent application is a continuation-in-part of U.S. Design patent application No. 29/405,470, which was filed on Nov. 2, 2011, which is expressly incorporated herein by reference.

BACKGROUND OF THE INVENTION

1. Field of the Invention

The present invention generally relates to a sulky, and specifically, to a sulky with adjustable wheel positions.

2. Description of the Related Art

A sulky is used in a type of horse racing commonly referred to as harness racing, or more specifically, low-wheeled harness racing. In harness racing, a rider rides on the sulky. The sulky is harnessed to a horse, and the horse pulls the sulky around a track. The sulky is also referred to as a bike.

The sulky includes a frame that supports the rider. The frame includes a cross-member disposed at a rear end of the sulky and shafts, also referred to as thills, spaced from each other and extending from the cross-member forwardly along a frame axis to a front end of the sulky. The shafts are mounted to the horse with the horse disposed between the shafts, i.e., the horse is generally disposed along the frame axis.

The sulky also includes first and second wheel supports each supporting a wheel. The first and second wheel supports are spaced from each other and extend downwardly from the frame. The wheels rest on the ground and support the first and second wheel supports, respectively.

The wheels are aligned with each other along the frame axis. As such, when the horse is attached to the frame between the shafts, i.e., along the frame axis, the sulky tends to roll along a straight path, i.e., along the axis, when the horse moves forwardly. In other words, since the wheels are aligned with each other along the axis, the wheels bias the sulky to roll along a straight path. The horse can overcome this bias and can pull the sulky from the straight path, however, during such a movement, the horse is working against the bias of the sulky and is required to exert additional energy to pull the sulky from the straight path.

Most tracks for racing sulkies are round or oval in shape depending upon the venue. The radius of curvature of the track can also vary between venues. In addition, variation exists between venues, specifically venues in varying countries, in the direction in which the race is run. Some venues race in a clockwise direction and other venues race in a counter-clockwise direction.

In addition, the angle of the first and second wheel supports relative to the ground is an important factor in the efficiency of the operation of the sulky. An improper angle of the first and second wheel supports relative to the ground can lead to unwanted bouncing of the sulky when pulled by the horse. Further, an improper angle of the first and second wheel supports relative to the ground is indicative of an improper fit of the sulky to the horse. In other words, the dimensions of the sulky do not properly match the dimensions of the horse, in which case the sulky the efficiency of the sulky is decreased such that the horse must exert additional energy to pull the sulky.

Accordingly, it would be advantageous to design a sulky that overcomes these disadvantages set forth above such that the efficiency of the sulky can be improved when used at different venues having varying size and race directions and such that the efficiency of the sulky can be improved when used with horses of various sizes.

SUMMARY OF THE INVENTION AND ADVANTAGES

The present invention includes a sulky comprising a frame. The frame includes a cross-member and a pair of shafts spaced from each other and extending from the cross-member forwardly along an axis. A first wheel and a second wheel each include a hub and a rim that rotates about the hub. A first wheel support and a second wheel support each rotatably extend downwardly from the frame. Each of the first and second wheel supports includes an adjustment feature defining a plurality of adjustment positions with the adjustment feature of the first wheel support configured to engage the first wheel in any one of the adjustment positions and with the adjustment feature of the second wheel support configured to engage the second wheel in any one of the adjustment positions. The plurality of adjustment positions of the first and second wheel supports are located along lines generally extending rearwardly along the axis and upwardly relative to the axis.

As such, the first and second wheels can be independently adjusted to different adjustment positions. Such an adjustment can be made to one or both of the wheels to better accommodate variations in curvature of different tracks and to accommodate variations on the rotational directions in which races are run at various tracks. Also, the first and second wheels can be both moved forwardly or rearwardly to better accommodate horses of varying sizes.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like parts throughout the several views, a sulky 20 is generally shown. Specifically, the sulky 20 may be used in a type of horse racing commonly referred to as harness racing, or more specifically, low-wheeled harness racing. In harness racing, a rider (not shown) rides on the sulky 20, which is harnessed to a horse (not shown), and the horse pulls the sulky 20 around a track (not shown). It should be appreciated that the sulky 20 may be any type of horse drawn vehicle without departing from the nature of the present invention.

Figure 1:
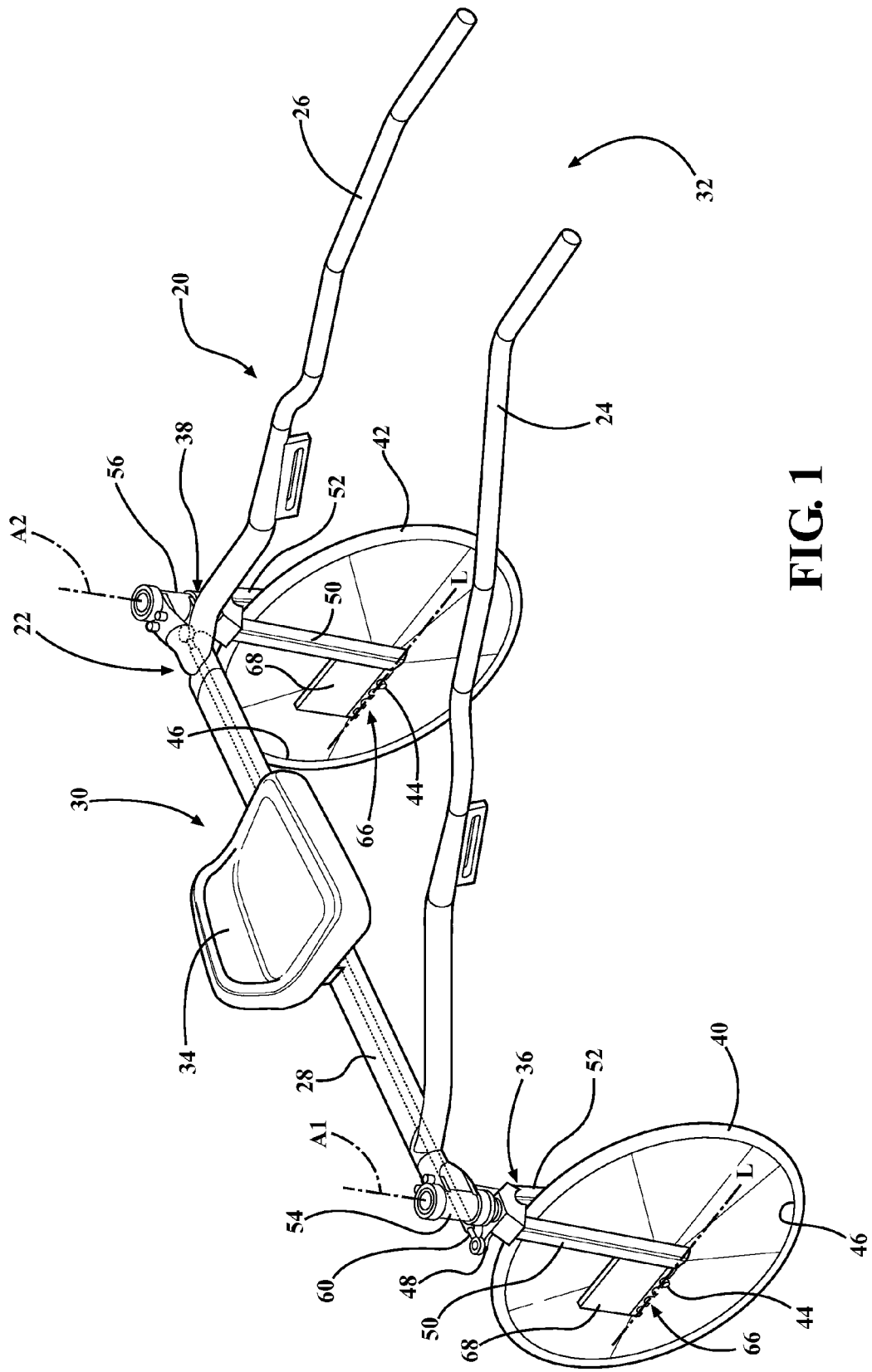
FIG. 1 is a perspective view of a sulky including a frame, first and second wheel supports, and wheels.
Figure 2:
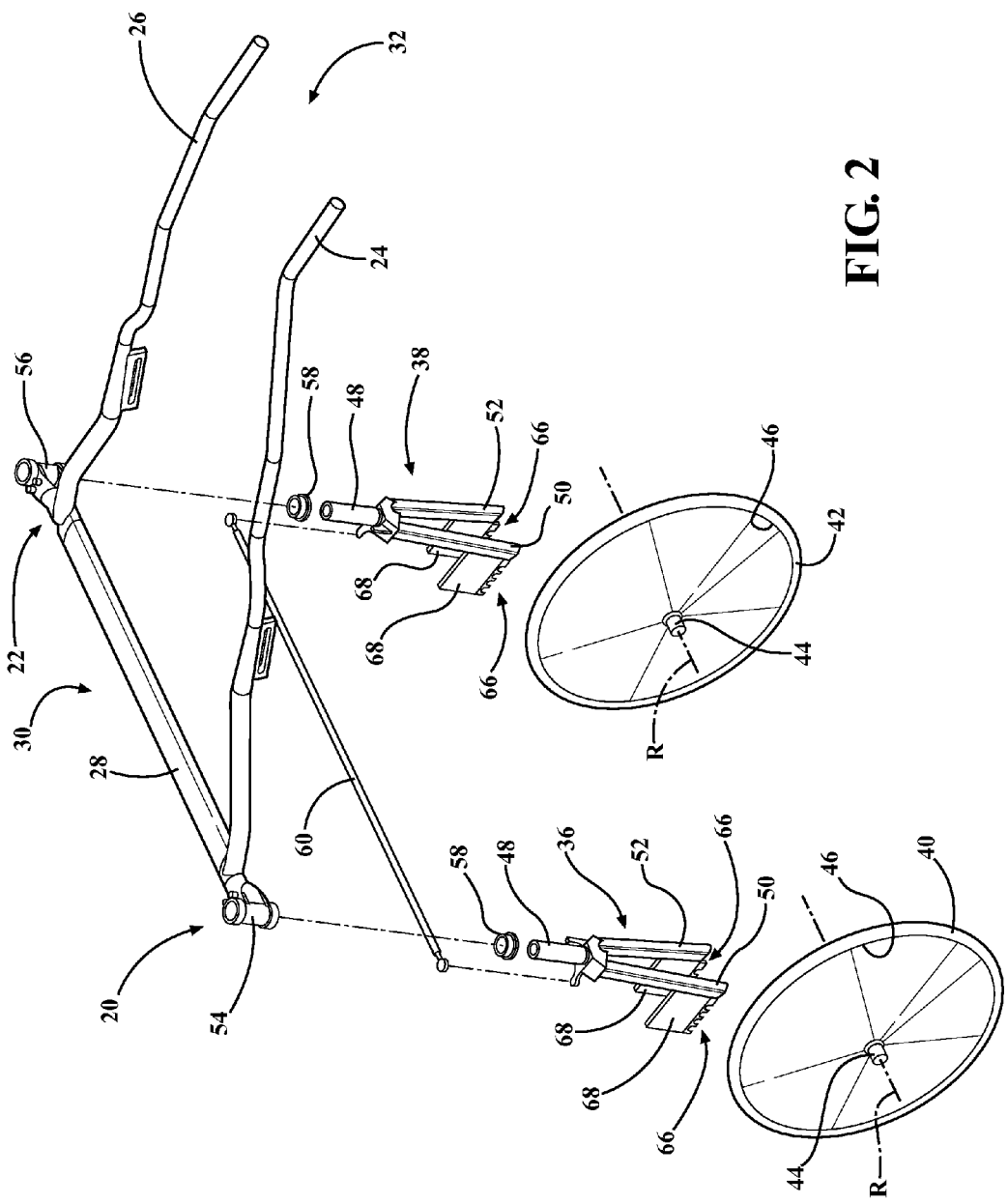
FIG. 2 is a partially exploded perspective view of the sulky.
Figure 3:
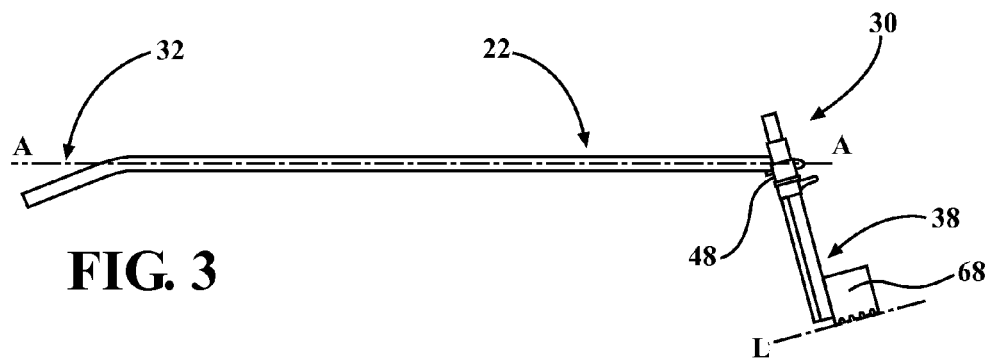
FIG. 3 is a side view of the sulky.
Figure 4:
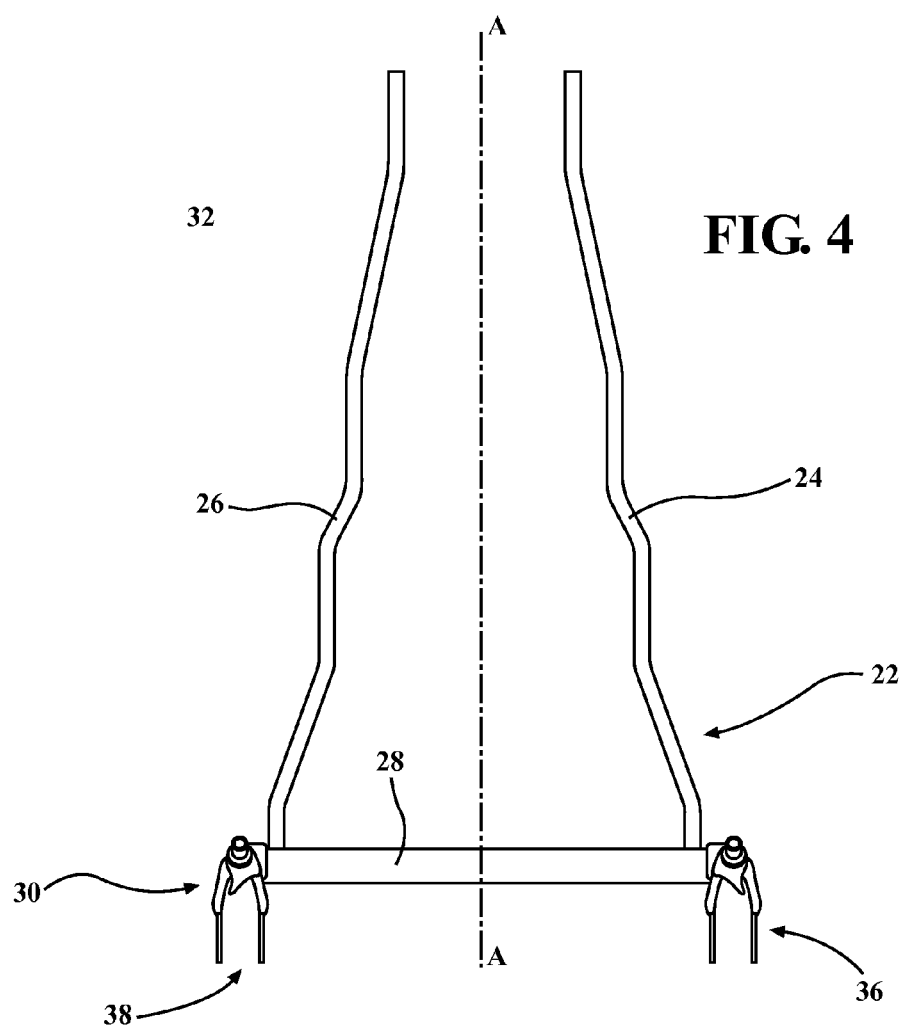
FIG. 4 is a top view of the sulky.
Figure 5:
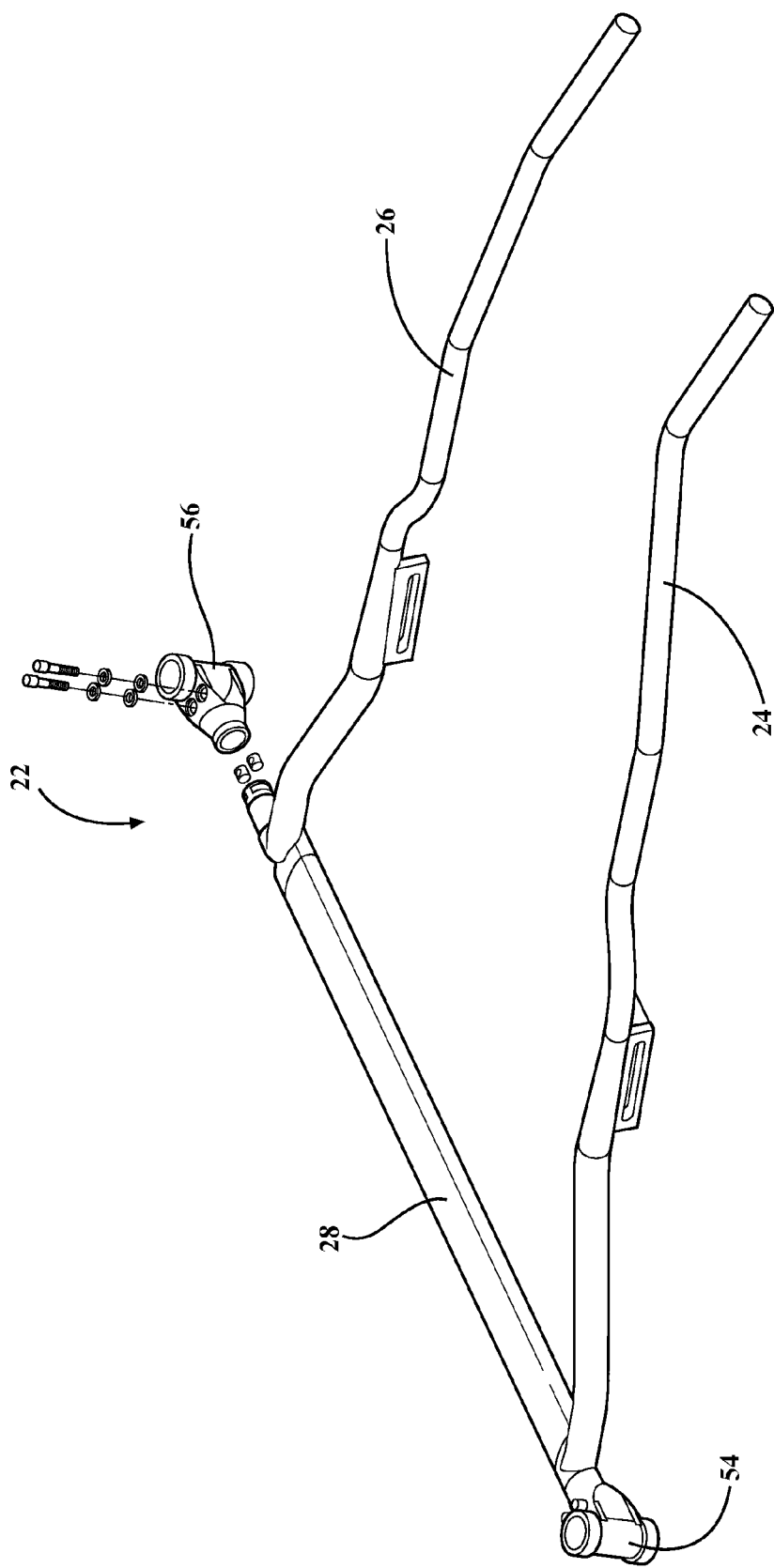
FIG. 5 is a partially exploded view of the frame of the sulky.
Figure 6:
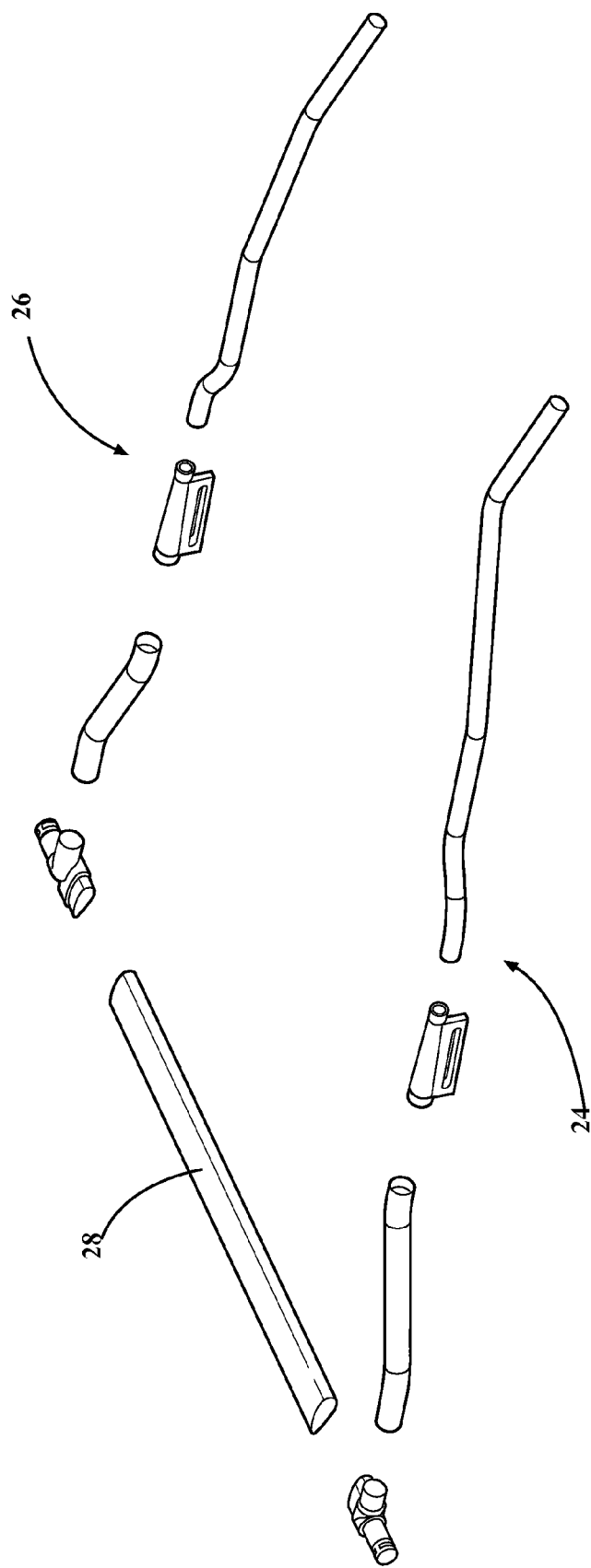
FIG. 6 is an exploded view of a portion of the frame.

As shown in FIGS. 1-6, the sulky 20 includes a frame 22 including a pair of shafts, i.e., a first shaft 24 and a second shaft 26, and a cross-member 28. The cross-member is disposed at a rear end 30 of the sulky 20 and the shafts 24, 26 are spaced from each other and extend from the cross-member 28 forwardly along a frame axis A to a front end 32 of the sulky 20. In other words, as best shown in FIGS. 3 and 4, the frame axis A extends from the cross-member 28 centrally between the pair of shafts 24, 26 and the shafts 24, 26. The shafts 24, 26 are also referred to by those skilled in the art as thills.

The shafts 24, 26 and the cross-member 28 are formed from any material known to one skilled in the art. For example, the shafts 24, 26 and the cross-member 28 can be formed of metal tubes. More specifically, for example, the first and second shafts 24, 26 and the cross-member 28 can be formed of aluminum, stainless steel, carbon fiber, titanium, etc.

The shafts 24, 26 are harnessed to the horse in any manner known to one skilled in the art. For example, a hitch is mounted to the horse and the shafts 24, 26 are coupled with the hitch. Alternatively, the shafts 24, 26 may be strapped about the body of the horse.

As set forth further below, the cross-member 28 extends between and is coupled to the shafts 24, 26. With continued reference to FIGS. 1-6, the shafts 24, 26 and the cross-member 28 are positioned such that the frame 22 is generally U-shaped.

As shown in FIG. 1, a seat 34 is supported on to the cross-member 28 for supporting the rider. The seat 34 can be moveable between a plurality of seat positions along the cross-member 28. The seat 34 and the cross-member 28 are configured to lock the seat 34 in any one of the plurality of seat positions. Alternatively, the seat 30 is mounted at a fixed position along the cross-member 28 at a midpoint between the first and second shafts 24, 26. The seat 34 is only shown in FIG. 1 and so that other features can be clearly shown in the other figures. It is appreciated that the seat can be any type of suitable seat without departing from the nature of the present invention.

As best shown in FIGS. 1-2, the sulky 20 includes a first and second wheel support 36, 38 spaced from each other and coupled to the frame 22. The first and second wheel supports 36, 38 each rotatably extend downwardly from the frame 22.

With continued reference to FIGS. 1 and 2, first and second wheels 40, 42 are mounted to the first and second wheel supports 36, 38, respectively. Each wheel 40, 42 includes a hub 44 and a rim 46 that rotates about the hub 44.

The first wheel support 36 extends from the frame 22 along a first axis A1 and is rotatably coupled to the frame 22 about the first axis A1. The second wheel support 38 extends from the frame 22 along a second axis A2 and is rotatably coupled to the frame 22 about the second axis A2. As discussed below, the first and second wheel supports 36, 38 are rotatable about the first and second axes A1, A2, respectively. The first axis A1 and the second axis A2 extend in parallel with each other. Alternatively, the first and second axes A1, A2 extend at an angle relative to each other such that the wheels 40, 42 are cambered inwardly from bottom to top, i.e., have a negative camber. It is appreciated that the first and second wheel supports 36, 38 can alternatively be rotationally fixed about the first and second axes A1, A2, respectively.

Each of the first and second wheel supports 36, 38 include an arm 48 rotatably connected to the frame 22 and a first and second prong 50, 52 extending from the arm 48 in a forked relationship. Each wheel 40, 42 is partially disposed between first and second prongs 50, 52. Specifically, as set forth further below, the hub 44 of the wheel 40, 42 is mounted to the first and second prongs 50, 52 along a rotational axis R of the wheel 40, 42.

The frame 22 includes a first sleeve 54 and a second sleeve 56. The first sleeve 54 is mounted to at least one of the first shaft 24 and the cross-member 28 and the second sleeve 46 is mounted to at least one of the second shaft 26 and the cross-member 28. In the embodiment shown in the Figures, the cross-member 30 is attached to and extends between the first and second sleeves 54, 56.

The first wheel support 36 is rotatably engaged with the first sleeve 54 and the second wheel support 38 is rotatably engaged with the second sleeve 56. For example, a rotational bearing 58 is disposed between the first and second wheel supports 36, 38 and the first and second sleeves 54, 56, respectively.

The sulky 20 can include a linkage 60 extending between and rotationally locking the first wheel support 36 and the second wheel support 38. In other words, the linkage transfers rotational movement between first and second wheel supports 36, 38 such that the first and second wheel supports 36, 38 rotate in unison about the first and second axes A1, A2, respectively.

It is appreciated that the sulky 20 can include features (not shown) for steering the first and second wheels 40, 42. For example, the sulky 20 can include the fetures for steering shown in U.S. Pat. No. 7,578,510, which is incorporated herein by reference.

Each of the first and second wheel supports 36, 38 include an adjustment feature 62 defining a plurality of adjustment positions 64. The adjustment feature 62 of the first wheel support 36 is configured to engage the first wheel 40 in any one of the adjustment positions 64 and the adjustment feature 62 of the second wheel support 38 is configured to engage the second wheel 42 in any one of the adjustment positions 64.

The first and second wheels 40, 42 can be independently adjusted relative to the first and second wheel supports 36, 38. In other words, the first wheel 40 can be moved to any one of the adjustment positions 64 independent of the adjustment position 64 of the second wheel 42 and, likewise, the second wheel 42 can be moved to any one of the adjustment positions 64 independent of the adjustment position 64 of the first wheel 40.

Figure 8:
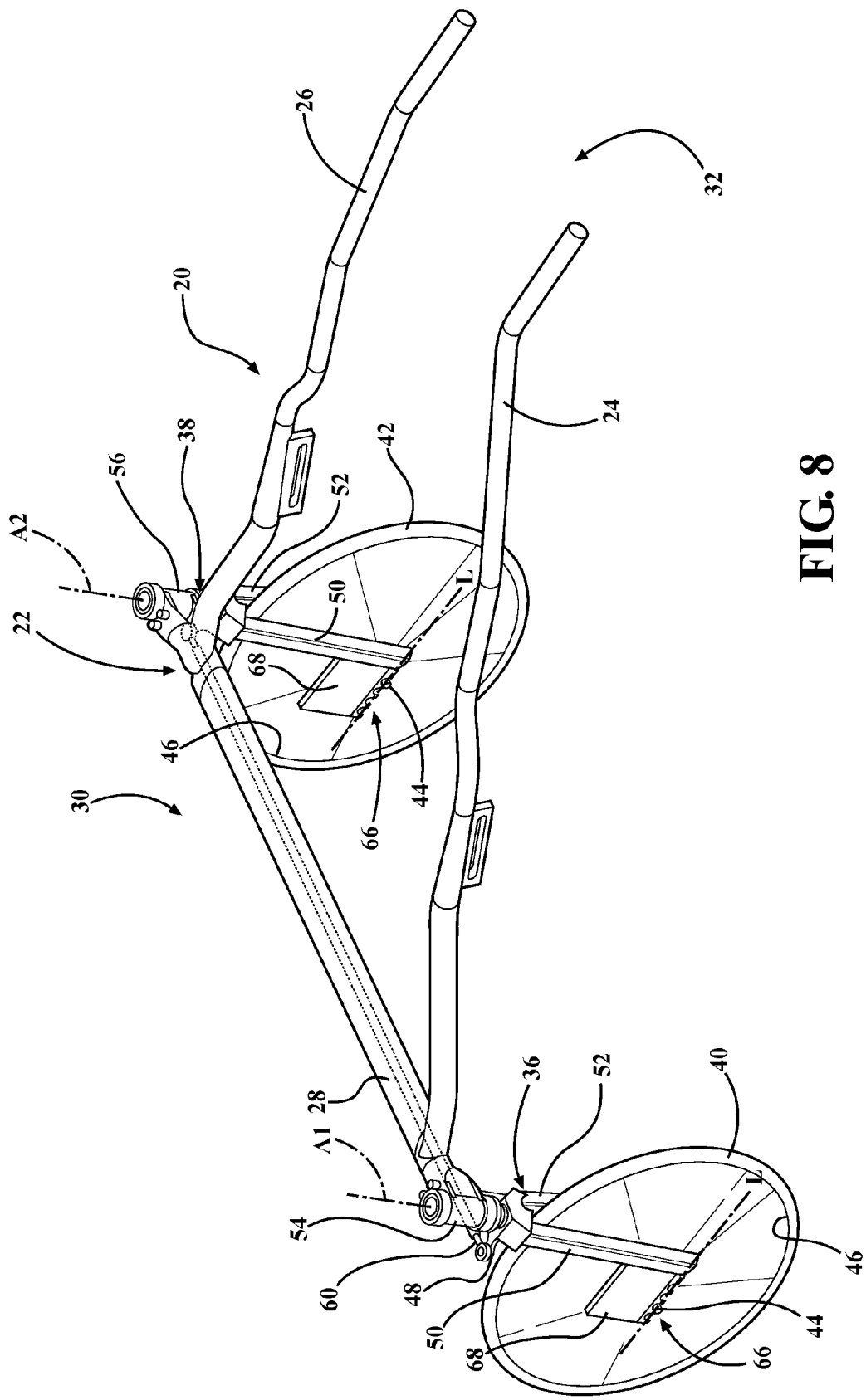
FIG. 8 is a perspective view of the sulky with the wheels moved to different adjustment positions relative to the wheel supports.
Figure 9:
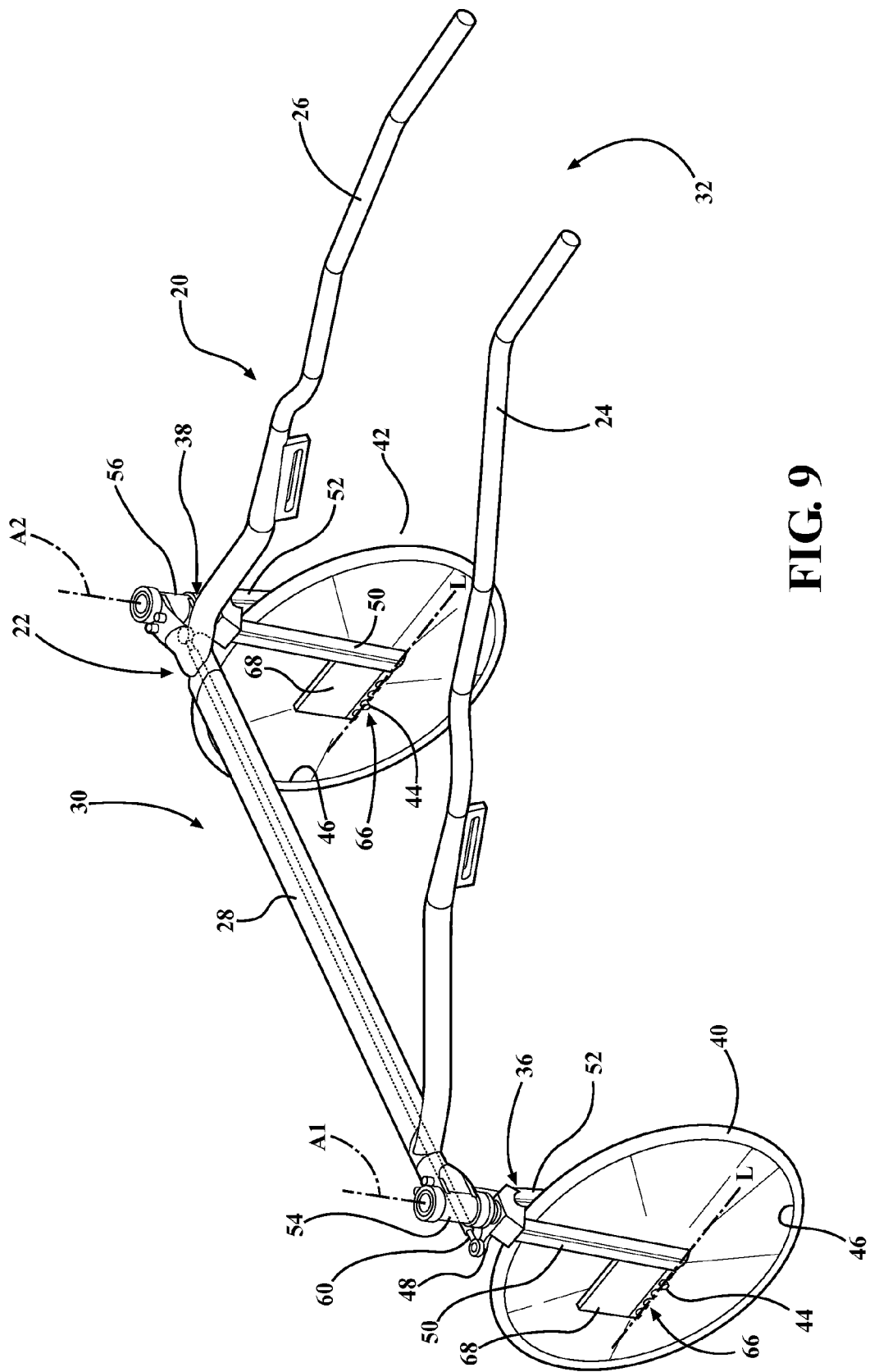
FIG. 9 is a perspective view of the sulky with the wheels moved to adjustment positions different than those of FIG. 8.

As such, the first and second wheels 40, 42 can be independently adjusted such that one of the wheels 40, 42 is in an adjustment position 64 closer to the front end 32 than the other wheel 40, 42. Such an adjustment can be made to better accommodate variations in curvature of different tracks and to accommodate variations on the rotational directions in which races are run at various tracks. For example, in FIG. 8 the second wheel 42 is engaged in an adjustment position closer to the front end 32 than the first wheel 40. In FIG. 9, the first wheel 42 is engaged in an adjustment position closer to the front end 32 than the second wheel 42.

The adjustment feature 62 can be further defined as a plurality of notches 66. In other words, the first and second wheel supports 36, 38 define the notches 66 and the first wheel support 36 is configured to engage the first wheel 40 in any one of the notches 66 and the second wheel support 38 is configured to engage the second wheel 42 in any one of the notches 66.

The hubs 44 engage the notches 66 of the first and second wheel supports 36, 38 to rotatably engage the first and second wheels 40, 42 to the first and second wheel supports 36, 38, respectively. The hubs 44 can be engaged with the notches 66 in any fashion without departing from the nature of the present invention. As one example, the hubs 44 can be threaded and can include nuts (not shown) that threadedly engage the hubs 44 and can be tightened onto the wheel support 36, 38 at the selected notch 66.

The plurality of adjustment positions 64 of the first and second wheel supports 36, 38 are located along lines L generally extending rearwardly along the frame axis A and upwardly relative to the frame axis A. For example, as shown in the Figures, the notches 66 of the first and second wheel supports 36, 38 are spaced along the lines L generally extending rearwardly along the frame axis A and upwardly relative to the frame axis A.

As such, the first and second wheels 40, 42 can be both adjusted to adjustment positions 64 closer to the front end 32 to better accommodate a relatively larger horse or can be both adjusted to adjustment positions 64 closer to the rear end 30 to better accommodate a relatively smaller horse.

As shown in FIGS. 1 and 2, the notches 66 open downwardly so that the first wheel support 36 rests on the hub 44 of the first wheel 40 and the second wheel support 38 rests on the hub 44 of the second wheel 40. The notches 66 of the first wheel support 36 extend along notch axes N, respectively, and the notch axes N are parallel to each other.

Figure 7:
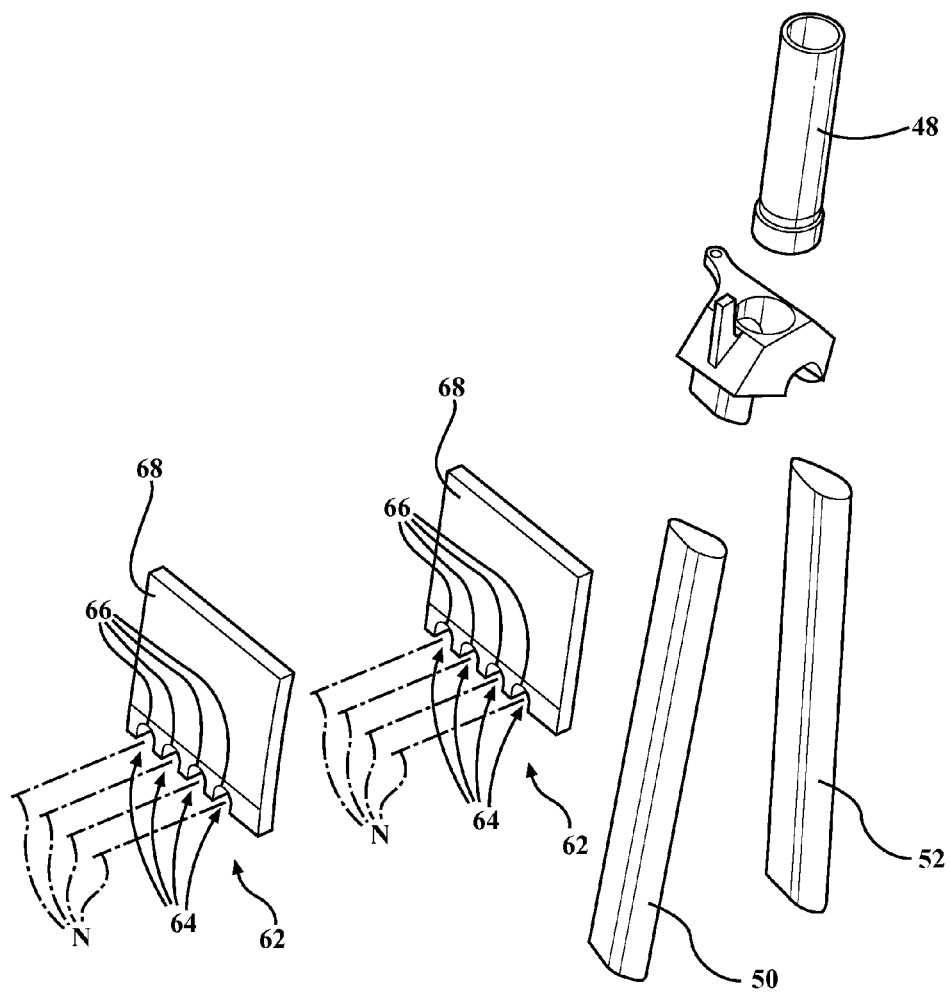
FIG. 7 is an exploded view of one of the wheel supports.

As best shown in FIG. 7, the first and second wheel supports 36, 38 each include a pair of plates 68 spaced from each other receiving the first and second wheels 40, 42, respectively, therebetween. The plates 68 each define the adjustment features 62, e.g., the notches 66.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A sulky comprising:
a frame including a cross-member and a pair of shafts spaced from each other and extending from said cross-member forwardly along an axis that extends along a longitudinal centerline of said frame;
a first wheel and a second wheel each including a hub and a rim that rotates about said hub; and
a first wheel support and a second wheel support each rotatably extending downwardly from said frame,
each of said first and second wheel supports including a plurality of notches with said first wheel support configured to engage said first wheel in any one of said notches and with said second wheel support configured to engage said second wheel in any one of said notches;
said notches of said first and second wheel supports spaced along lines generally extending rearwardly along said axis and upwardly relative to said axis.

2. The sulky as set forth in claim 1 wherein said notches open downwardly so that said first wheel support rests on said hub of said first wheel and said second wheel support rests on said hub of said second wheel.

3. The sulky as set forth in claim 1 wherein said notches of the first wheel support extend along notch axes, respectively, wherein said notch axes are parallel to each other.

4. The sulky as set forth in claim 1 further comprising a seat mounted to said cross-member.

5. The sulky as set forth in claim 4 wherein said seat is moveable between a plurality of seat positions along said cross-member.

6. The sulky as set forth in claim 5 wherein said seat and said cross-member are configured to lock said seat in any one of said plurality of seat positions.

7. The sulky as set forth in claim 1 wherein said first and second wheel supports each include a pair of plates spaced from each other receiving said first and second wheels, respectively, therebetween, said pair of plates each defining said notches.

8. The sulky as set forth in claim 1 further comprising a linkage connecting said first wheel support and said second wheel support and rotationally locking said first wheel support and said second wheel support.

9. A sulky comprising:
a frame including a cross-member and a pair of shafts spaced from each other and extending from said cross-member forwardly along an axis that extends along a longitudinal centerline of said frame;
a first wheel and a second wheel each including a hub and a rim that rotates about said hub; and
a first wheel support and a second wheel support each rotatably extending downwardly from said frame,
each of said first and second wheel supports including an adjustment feature defining a plurality of adjustment positions with said adjustment feature of said first wheel support configured to engage said first wheel in any one of said adjustment positions and with said adjustment feature of said second wheel support configured to engage said second wheel in any one of said adjustment positions;
said plurality of adjustment positions of said first and second wheel supports located along lines generally extending rearwardly along said axis and upwardly relative to said axis.

10. The sulky as set forth in claim 9 wherein said adjustment feature is further defined as notches configured to engage said hub.

11. The sulky as set forth in claim 10 wherein said notches open downwardly so that said first wheel support rests on said hub of said first wheel and said second wheel support rests on said hub of said second wheel.

12. The sulky as set forth in claim 10 wherein said notches of the first wheel support extend along notch axes, respectively, wherein said notch axes are parallel to each other.

13. The sulky as set forth in claim 9 further comprising a seat mounted to said cross-member.

14. The sulky as set forth in claim 13 wherein said seat is moveable between a plurality of seat positions along said cross-member.

15. The sulky as set forth in claim 14 wherein said seat and said cross-member are configured to lock said seat in any one of said plurality of seat positions.

16. The sulky as set forth in claim 9 wherein said first and second wheel supports each include a pair of plates spaced from each other receiving said first and second wheels, respectively, therebetween, said pair of plates each defining said adjustment feature.

17. The sulky as set forth in claim 9 further comprising a linkage connecting said first wheel support and said second wheel support and rotationally locking said first wheel support and said second wheel support.

* * * * *